United States Patent Office 2,839,560
Patented June 17, 1958

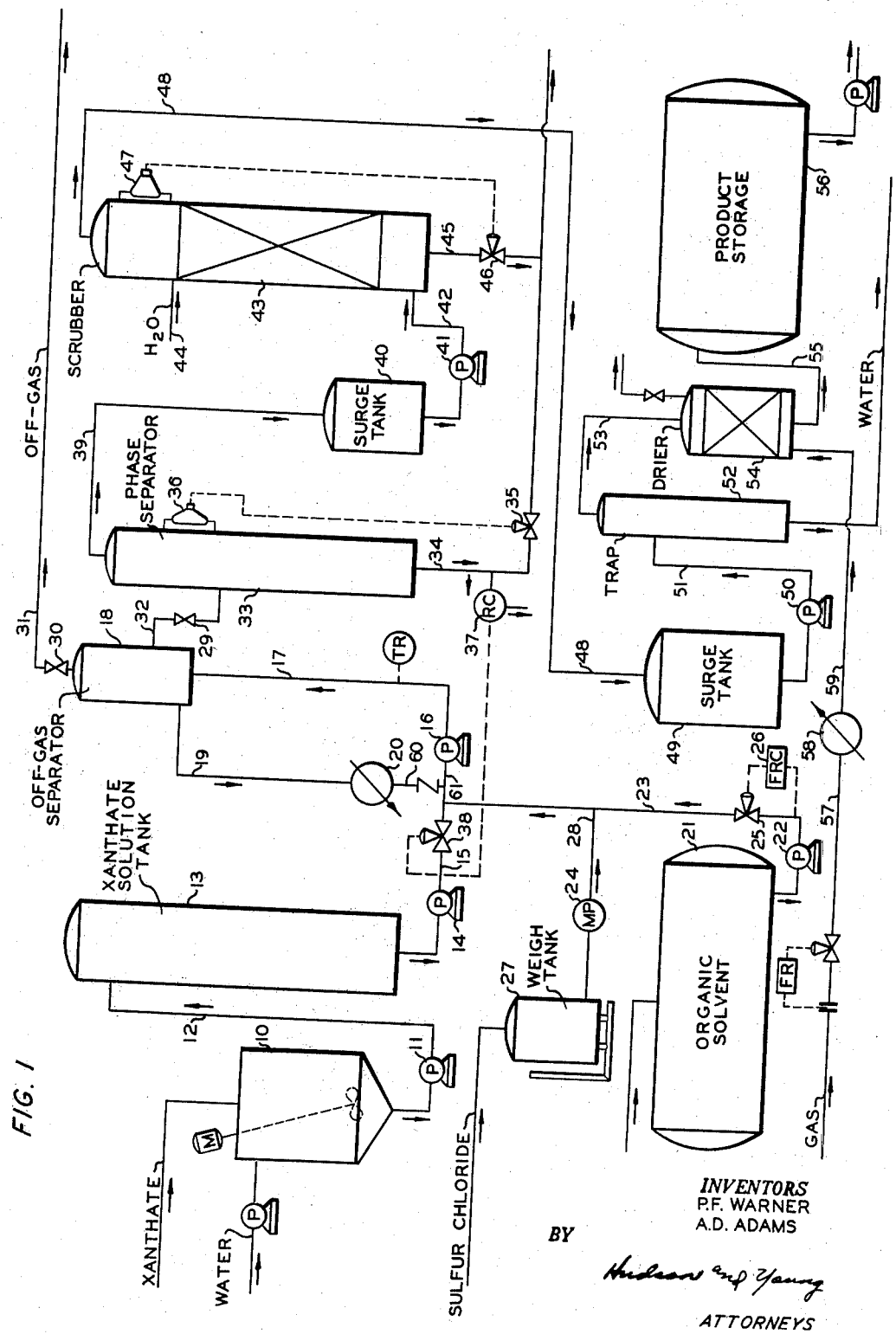

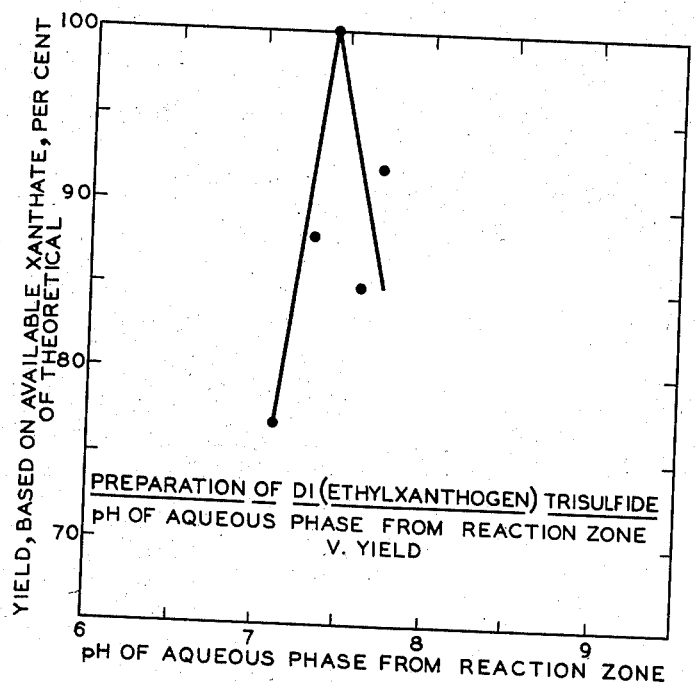
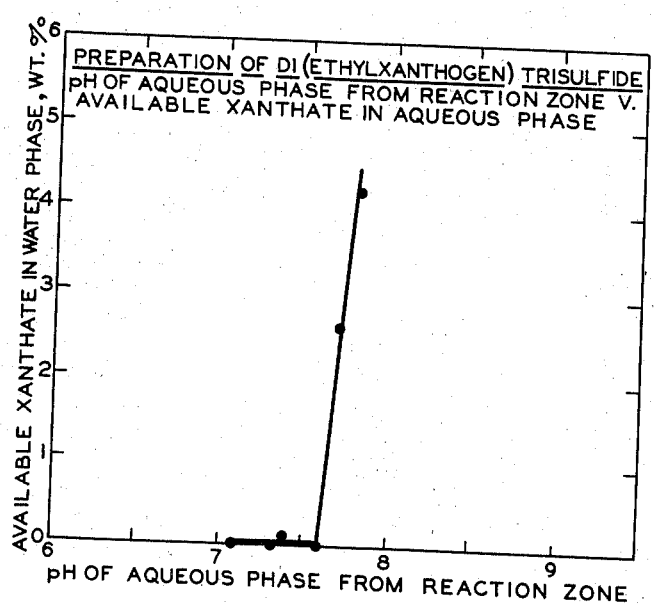

2,839,560
PRODUCTION OF ORGANIC XANTHOGEN SULFIDES

Paul F. Warner and Archie D. Adams, Phillips, Tex., assignors to Phillips Petroleum Company, a corporation of Delaware Application May 9, 1955, Serial No. 506,857

15 Claims. (Cl. 260—455)

This invention relates to the production of organic xanthogen sulfides. In one aspect this invention relates to the production of organic xanthogen sulfides by reacting an aqueous solution of an alkali metal xanthate or an ammonium xanthate with a chloride of sulfur. In another aspect this invention relates to controlling the rate of addition of at least one of said reagents to a reaction zone responsive to the pH of an aqueous phase in said reaction zone.

Organic xanthogen sulfides can be prepared by the reaction of alkali metal xanthates or an ammonium xanthate and a chloride of sulfur by at least two processes. In the so-called "dry" process a slurry of the xanthate, preferably an alkali metal xanthate, in an organic solvent is prepared. After the slurry is prepared, the sulfur chloride is then added, with stirring, at a controlled rate, i. e., as rapidly as the evolution of exothermic heat will permit and still maintain the temperature in the reaction zone at the desired level. The mixture is stirred for about 5 to 30 minutes after addition of the sulfur chloride is complete. The product is generally washed with water and dried. In the so-called "wet" process, an aqueous solution of the xanthate, preferably an alkali metal xanthate, is first prepared, and an organic solvent is then added. The sulfur chloride is then introduced at a controlled rate with constant stirring of the reaction mixture. The reaction is exothermic and the addition of the sulfur chloride is controlled at a rate such that the temperature can be maintained at the desired level. Stirring is generally continued for 5 to 30 minutes after addition of the sulfur chloride to allow time for further reaction. At the conclusion of the reaction the aqueous and organic solvent phases are separated. The organic solvent phase is washed with water and dried. Methods of preparation of various organic xanthogen sulfides and the use of same as plant defoliants are disclosed and claimed in co-pending application Serial No. 388,684, filed October 27, 1953. The above described "wet" process, i. e., wherein an aqueous solution of the xanthate is employed, is a presently preferred process and the present invention relates to an improvement in said process.

As mentioned, the reaction between alkali metal xanthates and sulfur chlorides is exothermic and in the prior art it has been customary to control the rate of addition of the reagents to each other so as to control the exothermic heat of reaction. In the above-described wet process an aqueous phase and an organic solvent phase are present in the reaction zone. We have found that when the pH of the aqueous phase in the reaction zone is maintained at a predetermined value between 7 and 8 an increased yield of the reaction product is obtained. More efficient utilization of the reagents and less corrosion of the processing equipment are also obtained when the pH is maintained within the above said limits. We have also found that the pH of the aqueous phase in the reaction zone can be controlled by controlling the rate of addition of at least one of the said reagents. We have further found that the addition of the reagents to the reaction zone can be conveniently and advantageously controlled responsive to the pH of the aqueous phase in the reaction zone.

An object of this invention is to provide an improved method for the production of organic xanthogen sulfides. Another object of this invention is to provide an improved method for reacting an aqueous solution of an alkali-metal xanthate or an ammonium xanthate with a chloride of sulfur to produce an organic xanthogen sulfide of improved quality in increased yield.

Another object of this invention is to control the rate of addition of at least one reagent to a reaction zone, in a system wherein an aqueous solution of an alkali-metal xanthate or an ammonium xanthate is reacted with a chloride of sulfur, responsive to the pH of the aqueous phase in said reaction zone.

Still another object of this invention is to reduce and/or eliminate corrosion in a system wherein an alkali-metal xanthate or an ammonium xanthate is reacted with a chloride of sulfur.

Still another object of this invention is to provide a method for reacting an aqueous solution of an alkali-metal xanthate or an ammonium xanthate with a chloride of sulfur whereby more efficient utilization of said reagents is effected.

Other aspects, objects and advantages of the invention will be apparent to those skilled in the art upon reading this disclosure.

According to the invention there is provided a process for the preparation of xanthogen tri- and tetrasulfides which comprises reacting an aqueous solution of an alkali metal xanthate and/or an ammonium xanthate with a chloride of sulfur in a reaction zone and maintaining the pH of the aqueous phase in said reaction zone at a predetermined value within the range of 7 to 8.

The organic xanthogen sulfides which can be prepared according to our invention can be represented by the formula

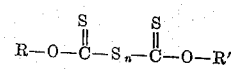

wherein R and R' are organic radicals selected from the group consisting of alkyl, cycloalkyl, aryl, alkaryl, and aralkyl groups, $n$ is an integer which can be one of 3 and 4, R and R' can be different, and each R and R' can contain from 1 to 10 carbon atoms.

Xanthates not necessarily equivalent to each other but which can be used to prepare organic xanthogen sulfides according to our invention can be represented by the formula

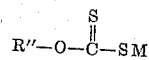

wherein R" is selected from the above named group of organic radicals which R and R' are selected from and M is selected from the group consisting of sodium, potassium, lithium, rubidium, caesium and ammonium ion ($NH_4^+$).

Chlorides of sulfur which can be used according to our invention include sulfur monochloride, $S_2Cl_2$, and sulfur dichloride, $SCl_2$. When sulfur dichloride is used the reaction product is predominantly the trisulfide. When sulfur monochloride is used the reaction product is predominantly the tetrasulfide. Mixtures of the two said chlorides of sulfur will result in a mixed product, the ratio of the tri-sulfide to the tetrasulfide in the product being proportional to the amounts of the said chlorides of sulfur in the starting reagent.

Typical organic xanthogen sulfides which can be prepared from the corresponding xanthates according to our invention include dimethylxanthogen trisulfide, dimethylxanthogen tetrasulfide, diethylxanthogen trisulfide, diethylxanthogen tetrasulfide, di-n-propylxanthogen trisulfide, di-n-propylxanthogen tetrasulfide, diisopropylxanthogen trisulfide, diisopropylxanthogen tetrasulfide, di-tert-butylxanthogen trisulfide, ethyl-tert-butylxanthogen tetrasulfide, methylethylxanthogen trisulfide, methylethylxanthogen tetrasulfide, ethylphenylxanthogen trisulfide, phenylbenzylxanthogen trisulfide, methylcyclohexylxanthogen tetrasulfide, ethylhexylxanthogen trisulfide, methylhexylxanthogen tetrasulfide, methyldecylxanthogen trisulfide, di-n-octylxanthogen trisulfide, di-n-decylxanthogen trisulfide, and the like.

Figure 1 is a diagrammatic flow sheet of the process of the invention.

Figure 2 is a graph showing the correlation between the pH of the aqueous phase in the reaction zone and product yield.

Figure 3 is a graph showing the correlation between the pH of the aqueous phase in the reaction zone and the amount of available unreacted xanthate in said aqueous phase.

Referring now to the drawings, and particularly to Figure 1, the invention will be more fully explained as applied to the manufacture of diethylxanthogen trisulfide. An aqueous solution of sodium ethyl xanthate, approximately 34 percent by weight, is first prepared in mixing vat 10 and transferred via pump 11 and line 12 to xanthate solution tank 13. Xanthate solutions is then pumped by means of pump 14 via line 15 through line 61, reactor pump 16, line 17, separator 18, line 19, cooler 20, and line 60. Pump 16, line 17, separator 18, line 19, cooler 20, line 60 and line 61 comprise the reaction zone. After circulation is thus established in the reaction zone, flow of organic solvent (described further hereinafter) is started from solvent storage tank 21 via pump 22, and line 23 into said reaction zone. The rate of flow of said organic solvent is controlled by motor valve 25 responsive to rate of flow controller 26. Flow of sulfur dichloride from weigh tank 27 via metering pump 24 and line 28 into said reaction zone is then started. Upon starting flow of the organic solvent valves 29 and 30 are opened. Upon starting the flow of the sulfur dichloride solution the temperature in the reaction zone rises to about 94° F. and is maintained at about this point by means of cooler 20. During the reaction a small amount of gas is formed which is vented through valve 30 and line 31. A mixture of organic phase and aqueous phase is withdrawn from gas separator 18 via line 32 and passed into phase separator 33. In said phase separator the aqueous phase and organic phase separate, the aqueous phase being withdrawn through line 34 and motor valve 35 responsive to liquid level controller 36. A sample of the aqueous phase in line 34 is continuously withdrawn and passed through pH recording controller 37 which is operatively connected to motor valve 38 in line 15. pH recording controller 37 is set to control the rate of addition of xanthate solution to the reaction zone responsive to the pH of the aqueous phase in line 34 by means of motor valve 38 and to maintain the pH of said aqueous phase at a predetermined value between 7 and 8.

Organic solvent phase is withdrawn from phase separator 33 via line 39 into surge tank 40. Said organic solvent phase containing the reaction product dissolved therein is pumped by means of pump 41 and line 42 into the bottom of scrubber 43 wherein it is contacted countercurrently with water introduced through line 44. Scrubber 43 is preferably a packed vessel containing a packing such as Berl saddles, Raschig rings, etc. Scrubbing water is withdrawn from the bottom of scrubber 43 via line 45 controlled by motor valve 46 responsive to liquid level controller 47. The ratio of the volume of scrubbing water to the volume of organic solvent is usually about 1:1; however, lower and higher ratios can be employed. Scrubbed organic solvent containing the reaction product dissolved therein is removed overhead from scrubber 43 and passed via line 48 into surge tank 49 from which it is pumped by means of pump 50 and line 51 through water trap 52 from which it passes via line 53 into drier 54. Drier 54 can be filled with any suitable drying agent which is non-reactive with the reaction product or the organic solvent. Bauxite, due to its ready availability and low cost, is a presently preferred drying agent. Dried organic solvent containing the reaction product is withdrawn from drier 54 through line 55 and stored in product storage 56.

The above method of preparation is particularly adapted to the preparation of solutions of organic xanthogen sulfides which are to be employed as plant defoliants. By thus preparing the sulfide in the presence of a suitable solvent which can also serve as the carrier for the sulfide defoliating agent, a finished defoliant which can be stored and shipped as such is obtained.

It is necessary, periodically, to regenerate the bauxite in drier 54. This can be done, as in well known to those well skilled in the art, by passing a stream of gas, such as natural gas, flue gas etc., through line 57, heater 58 and line 59 into drier 54 to remove the water absorbed by the drying agent therein. While only one drier has been shown it will be understood by those skilled in the art that two or more such driers, suitably manifolded in parallel so as to provide for at least one drier on stream at all times, can be employed.

TABLE I

*Operating conditions, concentrations and yields obtained during preparation of di(ethylxanthogen) trisulfide*

| Run No | 1 | 2 | 3 | 4 | 5 |
|---|---|---|---|---|---|
| Solvent Feed Rate, G. P. H.[1] | 25.5 | 29.9 | 34.7 | 33.7 | 26.0 |
| Sulfur Dichloride Feed Rate, lb./hr | 36.3 | 34.8 | 34.2 | 34.8 | 36.6 |
| Xanthate Solution Feed Rate, G. P. H.[1] | 26.2 | 28.0 | 25.5 | 28.2 | 24.9 |
| Concentration of available Xanthate in solution, wt. percent | 33.3 | 31.7 | 30.3 | 30.5 | 29.3 |
| Specific Gravity of Xanthate Solution, gm./ml. | 1.1880 | 1.1869 | 1.1866 | 1.1868 | 1.1854 |
| Reactor Pump Outlet Temp., F | 94 | 93 | 90 | 95 | 93 |
| Cooler Outlet Temp., F | | | 89 | 94 | |
| Reaction Zone Water Phase, pH | 7.1 | 7.3 | 7.7 | 7.4 | 7.6 |
| Available Xanthate in Water Phase, wt. percent | 0.0 | 0.0 | 2.6 | 0.1 | 0.0 |
| Water to Scrubber, G. P. H.[1] | 65 | 60 | 60 | 60 | 60 |
| Product Solution Refractive Index, n/20 | 1.4783 | 1.4820 | 1.4724 | 1.4807 | 1.4787 |
| Product Solution Specific Gravity, 20/20 | 0.8890 | 0.8976 | 0.8731 | 0.8937 | 0.8902 |
| Product Solution Concentration: | | | | | |
| wt. percent | 30.1 | 32.0 | 26.6 | 31.4 | 30.2 |
| lb./gal | 2.21 | 3.38 | 1.90 | 2.32 | 2.24 |
| Product Rate,[2] G. P. H.[1] | 31.9 | 37.8 | 42.9 | 42.9 | 32.4 |
| Yield, based on Available Xanthate, wt. percent of theoretical | 77 | 88 | 92 | 100 | 85 |

[1] Gallons per hour.
[2] Calculated from product solution concentration and solvent feed rate.

The aqueous phase from phase separator 33 is representative of the aqueous phase in the reaction zone. It is to be noted that the pH of said aqueous phase is maintained at a predetermined value within the range of 7 to 8, preferably within the range 7.0 to 8.0, more preferably within the range 7.2 to 7.6. When the pH of the aqueous phase is above about 7.6 the yield of the organic xanthogen sulfide decreases and all of the available xanthate is not being consumed in the reaction. When the pH of said aqueous phase drops to 7 or below excessive foaming and gas evolution occurs and an oil phase which is heavier than water is produced. The yield of the desired sulfide is also low when the pH is below 7.

Table I above summarizes operating conditions and yields obtained in five different runs wherein sodium ethylxanthate and sulfur dichloride were reacted to prepare di(ethylxanthogen) trisulfide.

Figure 2 is a graph showing correlation between the pH of the aqueous phase in the reaction zone and the product yield.

The data given in Table I and Figure 2 represent the results of runs made to determine the optimum pH at which to maintain the aqueous phase in the reaction zone. Other runs had indicated the necessity for maintaining said pH above about seven and below about eight. Said other runs had definitely shown that if the pH of the aqueous phase in the reaction zone was above eight, the yield of sulfide was low and all the available xanthate was not being consumed in the reaction; if the pH was below seven excessive foaming and gas evolution would occur and an oil phase that was heaver than water would be produced causing a reduction in yield. Said foaming and gas evolution also interrupted circulation within the reaction zone.

It is to be noted from a comparison of the data in Table I and Figure 2 that the maximum yield was obtained at a pH of about 7.4 to 7.5.

Another outstanding advantage of our invention is that, when the pH of the aqueous phase in the reaction zone is maintained at a predetermined value within the range of 7 to 8 the quantities of the reagents present in said zone are substantially stoichiometrically balanced, and there is substantially complete utilization of both reagents. Both reagents are relatively expensive. Further, there is no convenient practical method for the recovery of unreacted reagents from the reaction product. Therefore, the economic advantages of our invention, in addition to the previously discussed increased product yield and quality, will be readily appreciated by those skilled in the art. Figure 3 illustrates the marked savings which can be realized, with regard to the xanthate, when operating according to our invention.

A still further advantage of our invention is that ordinary corrosion resistant materials of construction such as 310 stainless steel, 316 stainless steel, Monel metal, Hastelloy B and Hastelloy C, can be employed. When the pH of the aqueous phase is not maintained at least above 7.0 non-metallic materials of construction must be employed.

The sodium ethylxanthate employed in the above runs was a commercial product and had the following approximate analysis.

| Components: | Weight percent |
|---|---|
| Sodium ethylxanthate | 84.5 |
| Sodium sulfide | 1.7 |
| Sodium thiocarbonate | 3.4 |
| Other (by difference): | |
|   Sodium carbonate | |
|   Sodium sulfite | 10.4 |
|   Sodium thiosulfate | |
| | 100.0 |

The sulfur dichloride employed in the above run was a commercial product having a specification of a minimum chlorine content of 66 percent.

The organic solvent employed in the above runs was a commercially available Phillips Soltrol solvent and had the following properties:

| | |
|---|---|
| Gravity, API at 60 F | 51.2 |
| Aromatics, vol. percent | 0.00 |
| Paraffins+naphthenes, vol. percent | 98.6 |
| Bromine number, electrometric method | 1.2 |
| Total sulfur, wt. percent | 0.0017 |
| Aniline number, F | 210 |
| Distillation, ASTM D86–46: | |
|   IBP _____F | 428 |
|   5 _____percent | 432 |
|   10 _____do | 433 |
|   20 _____do | 435 |
|   50 _____do | 439 |
|   90 _____do | 446 |
|   95 _____do | 448 |
|   D. P. | 450 |
|   E. P. | 462 |

Other organic solvents can be employed in the process of our invention. Solvents which are generally preferred, particularly when the sulfides are to be used as defoliants, are paraffinic hydrocarbons. Single hydrocarbon compounds or mixtures can be used. Suitable paraffinic hydrocarbons include those of relatively low boiling point, such as propane, butanes, pentanes and hexanes. Of particular interest are the highly branched isoparaffinic hydrocarbons, containing from 9 to 20 carbon atoms per molecule, having boiling points in the range between 260 and 800° F. These materials can be obtained from any suitable source. Convenient methods for their preparation include alkylation of isoparaffins with monoolefins, using catalysts such as hydrogen fluoride, aluminum chloride, sulfuric acid, or the like. However aromatic solvents are not excluded. The choice of organic solvent to be used will depend to a large extent on the use to be made of the sulfide product and whether or not said product is to be used in solution or recovered from the solvent. The amount of solvent used is generally sufficient to give a product concentration of from 2.0 to 2.5 pounds per gallon of solvent. However, quantities of solvent above and below this amount can be employed.

The temperature in the reaction zone is usually maintained within the range of 40 to 140° F., preferably within the range of 90 to 110° F.

Sufficient pressure is employed to maintain the solvent in liquid phase.

Approximately 2 mols of the xanthate are usually employed per mol of the sulfur chloride. In general, the amount of xanthate used is in the range between 1.5 and 3, preferably between 1.8 and 2.5, mols per mol of the sulfur chloride. Although the rate of addition of either reagent to the other can be controlled according to the invention, it is presently preferred to set and maintain the sulfur chloride feed rate substantially constant, and then vary the feed rate of the xanthate solution so as to maintain the pH of the aqueous phase in the reaction zone within the range of 7.0 and 8.0 as described above.

It is theoretically possible to analyze each feed stream and then calculate the amount of each to be used in order to maintain the proper ratio of reactants in the reaction zone. However this approach to the problem is entirely impractical in continuous commercial operation because neither of the feed streams are pure material. The sulfur dichloride has a specification of 66 percent minimum chlorine content which represents about a 95 percent solution of sulfur dichloride. However, the sulfur dichloride is somewhat unstable and easily reverts to the sulfur monochloride making it almost impossible to determine and know the composition of the stream at all times in continuous operation.

Furthermore, xanthate solutions react slowly with water and unless some provision such as that provided by our invention is made an error in the amount of xanthate can occur.

As pointed out above it is very desirable to maintain the pH of the aqueous phase in the reaction zone within relatively narrow limits for maximum efficiency of the process. Thus the advantages of our invention, which provides a method for realizing the maximum efficiency of the process will be readily apparent to those skilled in the art in view of this disclosure.

While in this specification and in the claims the terminology employed is considered applicable, the compounds prepared according to the invention can be called dixanthogen tri- and tetrasulfides, as indicated by the formula given herein therefor. Also, the employ of parenthesis is possible in the names of the compounds, for example, "di(ethylxanthogen) trisulfide."

As will be evident to those skilled in the art, various modifications of the invention can be made, or followed, in the light of the foregoing disclosure and discussion, without departing from the spirit or scope of the disclosure or from the scope of the claims.

We claim:

1. A process for the preparation of an organic xanthogen sulfide which can be represented by the formula

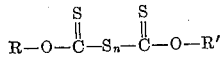

wherein R and R' are organic radicals selected from the group consisting of alkyl, cycloalkyl, aryl, alkaryl, and aralkyl groups, $n$ is an integer which can be one of 3 and 4, R and R' can be different, and each R and R' can contain from 1 to 10 carbon atoms; which process comprises, reacting at a temperature within the range of 40 to 140° F. an aqueous solution of a xanthate represented by the formula

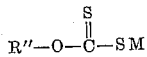

wherein R'' can contain from 1 to 10 carbon atoms and is selected from the above named group of organic radicals and M is selected from the group consisting of sodium, potassium, lithium, rubidium, caesium, and ammonium, with a chloride of sulfur selected from the group consisting of sulfur monochloride and sulfur dichloride, by continuously adding a stream of said xanthate and a stream of said chloride of sulfur to a reaction zone in the presence of an organic solvent capable of dissolving said organic xanthogen sulfides, measuring the pH of the resulting aqueous phase in said reaction zone, and adding and reacting said reagents in substantially stoichiometrically balanced amounts by controlling the rate of addition of one of said reagents responsive to the pH of said resulting aqueous phase in said reaction zone, so as to maintain the pH of said aqueous phase within the range of 7 to 8.

2. A process according to claim 1 wherein the rate of addition of said solution of said xanthate to said reaction zone is controlled so as to maintain said pH within the range of 7.0 to 8.0.

3. A process according to claim 1 wherein the rate of addition of said chloride of sulfur to said reaction zone is controlled so as to maintain said pH within the range of 7.0 to 8.0.

4. In a process for the preparation of a di(alkylxanthogen) trisulfide having from 1 to 10 carbon atoms in each alkyl group wherein an aqueous solution of an alkali-metal xanthate is reacted with sulfur dichloride in a reaction zone at a temperature within the range of 40 to 140° F. in the presence of an organic solvent capable of dissolving said tri-sulfide and wherein there exists in said reaction zone an aqueous phase and an organic solvent phase, the improvement which comprises continuously adding a stream of said xanthate and a stream of said sulfur dichloride to said reaction zone, measuring the pH of said aqueous phase, and adding and reacting said reagents in substantially stoichiometrically balanced amounts by controlling the rate of addition of one of said reagents to said reaction zone responsive to the pH of said aqueous phase, so as to maintain the pH of said aqueous phase within the range of 7 to 8.

5. A process according to claim 4 wherein said xanthate is sodium ethyl xanthate and the rate of addition of said xanthate to said reaction zone is controlled so as to maintain said pH within the range of 7.0 to 8.0.

6. A process according to claim 4 wherein said xanthate is potassium ethyl xanthate and the rate of addition of said xanthate to said reaction zone is controlled so as to maintain said pH within the range of 7.0 to 8.0.

7. A process according to claim 4 wherein said xanthate is sodium ethyl xanthate and the rate of addition of said sulfur dichloride is controlled so as to maintain said pH within the range of 7.0 to 8.0.

8. A process according to claim 4 wherein said xanthate is potassium ethyl xanthate and the rate of addition of said sulfur dichloride is controlled so as to maintain said pH within the range of 7.0 to 8.0.

9. In a process for the preparation of a di(alkylxanthogen) tetrasulfide having from one to ten carbon atoms in each alkyl group, wherein an aqueous solution of an alkali-metal xanthate is reacted with sulfur monochloride in a reaction zone at a temperature within the range of 40 to 140° F. in the presence of an organic solvent capable of dissolving said tetra-sulfide and wherein there exists in said reaction zone an aqueous phase and an organic solvent phase, the improvement which comprises continuously adding a stream of said xanthate and a stream of said sulfur monochloride to said reaction zone, measuring the pH of said aqueous phase, and adding and reacting said reagents in substantially stoichiometrically balanced amounts by controlling the rate of addition of one of said reagents to said reaction zone responsive to the pH of said aqueous phase, so as to maintain the pH of said aqueous phase within the range of 7 to 8.

10. A process according to claim 9 wherein said xanthate in sodium ethyl xanthate and the rate of addition of said xanthate to said reaction zone is controlled so as to maintain said pH within the range of 7.0 to 8.0.

11. A process according to claim 9 wherein said xanthate is potassium ethyl xanthate and the rate of addition of said xanthate to said reaction zone is controlled so as to maintain said pH within the range of 7.0 to 8.0.

12. A process according to claim 9 wherein said xanthate is sodium ethyl xanthate and the rate of addition of said sulfur monochloride is controlled so as to maintain said pH within the range of 7.0 to 8.0.

13. A process according to claim 9 wherein said xanthate is potassium ethyl xanthate and the rate of addition of said sulfur monochloride is controlled so as to maintain said pH within the range of 7.0 to 8.0.

14. A process according to claim 1 wherein the pH of said aqueous phase is maintained within the range of 7.2 to 7.6.

15. A continuous process for the preparation of an organic xanthogen sulfide which can be represented by the formula

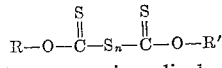

wherein: R and R' are organic radicals selected from the group consisting of alkyl, cycloalkyl, aryl, alkaryl, and aralkyl groups; $n$ is an integer which can be one of 3 and 4; R and R' can be different; and each R and R' can contain from 1 to 10 carbon atoms; which process comprises; continuously passing to a reaction zone an aqueous solution of a xanthate represented by the formla

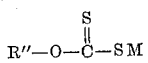

wherein R'' can contain from 1 to 10 carbon atoms and is selected from the above named group of organic radicals and M is selected from the group consisting of sodium, patossium, lithium, rubidium, caesium, and ammonium ion; continuously passing a solution of a chloride of sulfur selected from the group consisting of sulfur monochloride and sulfur dichloride to said reaction zone; continuously passing an organic solvent capable of dissolving said organic xanthogen sulfides to said reaction zone; maintaining said reaction zone at a temperature within the range of 40 to 140° F.; continuously circulating reaction mixture within said reaction zone; continuously withdrawing a portion of said circulating reaction mixture from said reaction zone and passing same to a separation zone; in said separation zone effecting a phase separation between an aqueous phase and a solvent phase containing dissolved xanthogen sulfides; withdrawing said solvent phase from said separtaion zone; withdrawing said aqueous phase from said separation zone; measuring the pH of said withdrawn aqueous phase; and adding and reacting said reagents in substantially stoichiometrically balanced amounts by controlling the rate of addition of one of said reagents to said reaction zone responsive to the pH of said withdrawn aqueous phase so as to maintain the pH of said aqueous phase in said reaction zone within the range of 7 to 8.

References Cited in the file of this patent

UNITED STATES PATENTS 1,634,924  Whitby ---------------- July 5, 1927